United States Patent
Nagaoka

(10) Patent No.: US 9,100,567 B2
(45) Date of Patent: Aug. 4, 2015

(54) IMAGING DEVICE COMPRISING TWO OPTICAL SYSTEMS

(71) Applicant: PANASONIC CORPORATION, Osaka (JP)

(72) Inventor: Eiichi Nagaoka, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 19 days.

(21) Appl. No.: 13/676,691

(22) Filed: Nov. 14, 2012

(65) Prior Publication Data

US 2013/0120641 A1    May 16, 2013

(30) Foreign Application Priority Data

Nov. 16, 2011 (JP) ................................ 2011-250363
Sep. 21, 2012 (JP) ................................ 2012-208477

(51) Int. Cl.
  *H04N 5/232* (2006.01)
  *H04N 5/225* (2006.01)

(52) U.S. Cl.
  CPC ......... *H04N 5/23212* (2013.01); *H04N 5/2258* (2013.01)

(58) Field of Classification Search
  CPC .................................................. H04N 5/23212
  USPC .......................................... 348/345; 382/106
  See application file for complete search history.

(56) References Cited

U.S. PATENT DOCUMENTS

| | | | |
|---|---|---|---|
| 6,853,809 B2* | 2/2005 | Pelletier ........................... | 396/85 |
| 2002/0030741 A1* | 3/2002 | Broemmelsiek ............... | 348/169 |
| 2005/0128291 A1* | 6/2005 | Murakami ..................... | 348/143 |
| 2010/0157064 A1* | 6/2010 | Cheng et al. .................. | 348/169 |
| 2011/0242346 A1* | 10/2011 | Ego .............................. | 348/222.1 |
| 2011/0286634 A1* | 11/2011 | Imamura ....................... | 382/106 |

FOREIGN PATENT DOCUMENTS

| | | |
|---|---|---|
| JP | 2005-148249 A | 6/2005 |
| JP | 2010-118984 A | 5/2010 |
| JP | 2010-134291 A | 6/2010 |

* cited by examiner

*Primary Examiner* — Joel Fosselman

(74) *Attorney, Agent, or Firm* — McDermott Will & Emery LLP

(57) ABSTRACT

The imaging device includes: a first optical system; a second optical system; a first imaging element configured to convert an optical image of a first shooting range formed by the first optical system into an electrical signal; a second imaging element configured to convert an optical image of a second shooting range formed by the second optical system into an electrical signal; a first focus driving section configured to shift a focus lens of the first optical system to a focus position of a first object in the first shooting range; and a movement prediction section configured to predict movement of an image of a second object in the second shooting range. The first focus driving section shifts the focus lens of the first optical system to a position different from the focus position of the first object, according to a result of the prediction of the movement prediction section.

5 Claims, 8 Drawing Sheets

IMAGING DEVICE COMPRISING TWO OPTICAL SYSTEMS

CROSS REFERENCE TO RELATED APPLICATION

The disclosures of Japanese Patent Application No. 2011-250363, filed on Nov. 16, 2011, and Japanese Patent Application No. 2012-208477, filed on Sep. 21, 2012, are incorporated herein by reference.

BACKGROUND

1. Field

The present disclosure relates to an imaging device such as a digital still camera and a digital video camera.

2. Description of the Related Art

Japanese Laid-Open Patent Publication No. 2005-148249 discloses a camera that independently controls focusing operations of two imaging optical systems in order to shorten a focusing time. In addition, Japanese Laid-Open Patent Publication No. 2010-118984 discloses an imaging device in which a sub-camera detects an object and a warning is given to a photographer.

SUMMARY

The present disclosure provides an imaging device that can instantly focus on an object even when the object suddenly enters a shooting range from its outside.

An imaging device according to the present disclosure includes a first optical system; a second optical system; a first imaging element configured to convert an optical image of a first shooting range formed by the first optical system into an electrical signal; a second imaging element configured to convert an optical image of a second shooting range formed by the second optical system into an electrical signal; a first focus driving section configured to shift a focus lens of the first optical system to a focus position of a first object included in the first shooting range; and a movement prediction section configured to predict movement of an image of a second object included in the second shooting range. The first focus driving section shifts a position of the focus lens of the first optical system to a position different from the focus position of the first object, according to a result of the prediction of the movement prediction section.

The imaging device according to the present disclosure is effective for instantly focusing on an object even when the object suddenly enters a shooting range from its outside.

DETAILED DESCRIPTION

Hereinafter, embodiments will be described in detail with appropriate reference to the drawings. It is noted that a more detailed description than need may be omitted. For example, the detailed description of already well-known matters and the overlap description of substantially same configurations may be omitted. This is to avoid an unnecessarily redundant description below and to facilitate understanding of a person skilled in the art.

It is noted that the inventor provides the accompanying drawings and the following description in order that a person skilled in the art may fully understand the present disclosure, and do not intend to limit the subject matter defined by the claims.

Embodiment 1

Hereinafter, Embodiment 1 will be described with reference to FIGS. 1 to 4.

[1-1. Configuration]

Figure 1:
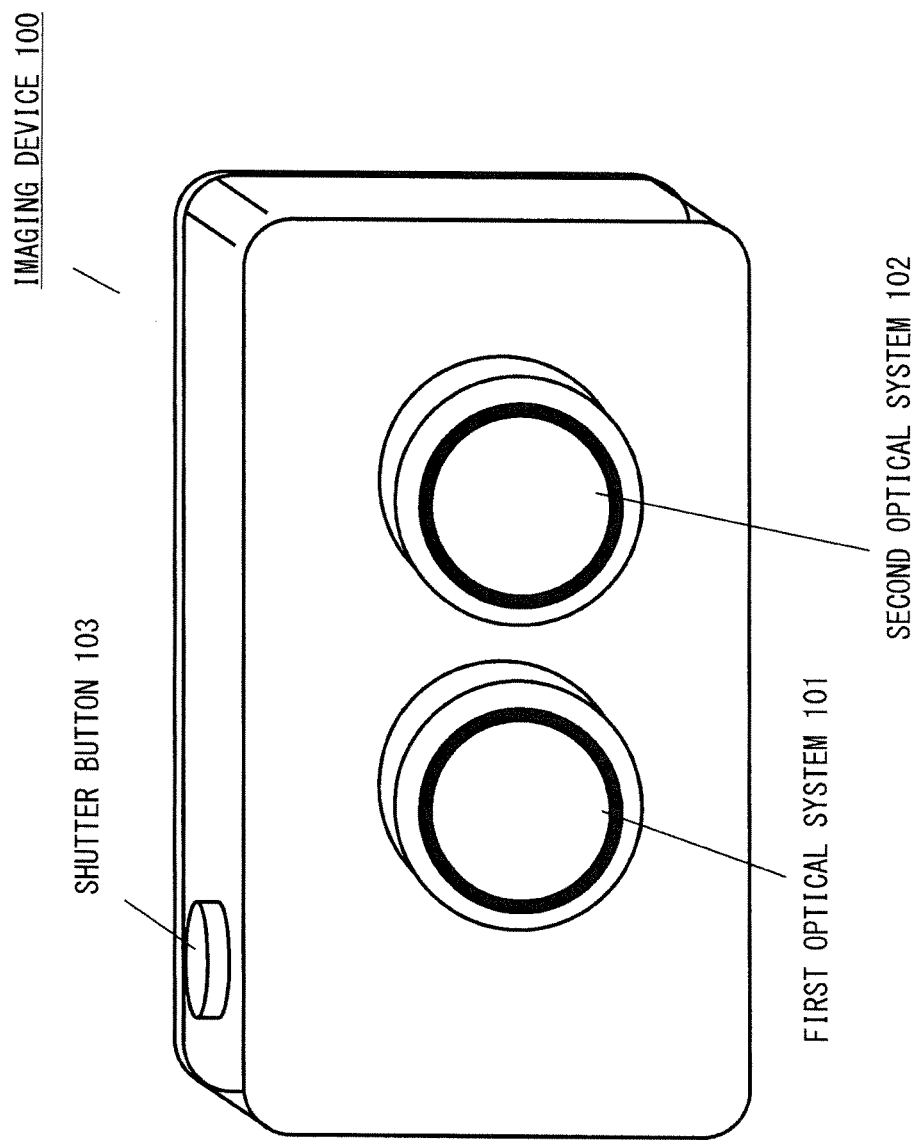
FIG. 1 is an external view of an imaging device according to Embodiment 1.

As shown in in external view of FIG. 1, an imaging device 100 includes a first optical system 101 and a second optical system 102. A shutter button 103 is provided on an upper portion of the imaging device 100. A timing of taking a still image is determined by pressing the shutter button 103. In addition, the imaging device 100 is configured such that when taking a moving image, shooting is started by pressing the shutter button 103 and is ended by pressing the shutter button 103 again.

Figure 2:
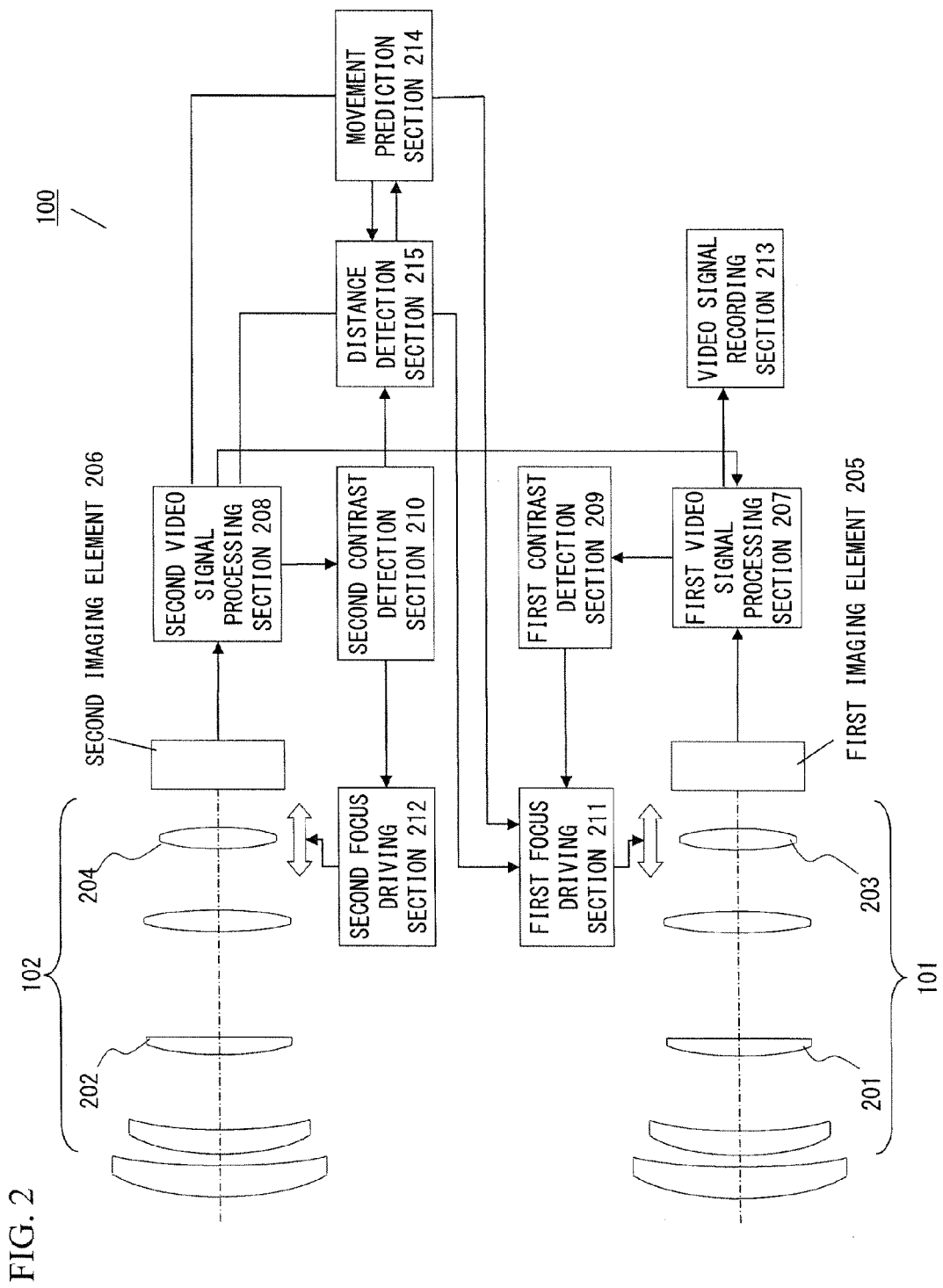
FIG. 2 is a block diagram illustrating the configuration of the imaging device according to Embodiment 1.

FIG. 2 shows the configuration of the imaging device 100 in a block diagram. The imaging device 100 includes the first optical system 101, the second optical system 102, a first imaging element 205, and a second imaging element 206. The first optical system 101 is a zoom optical system. In other words, by shifting a first zoom lens 201 frontward and backward, the shooting view angle changes (the zoom power changes). For example, the focal length can be changed from the wide-angle side toward the telephoto side by five times. In addition, the first optical system 101 includes a first focus lens 203 which adjusts a focus position. By shifting the first focus lens 203 frontward and backward, the focus position can be changed between a close range and infinity. For example, in order to focus on an object at an infinity distance such as a mountain or a grove, the first focus lens 203 is shifted forward (leftward in FIG. 2). For an object at a close distance in macro photography, the first focus lens 203 is shifted backward (rightward in FIG. 2) to achieve focus.

The first imaging element 205 converts an optical image formed by the first optical system 101 into an electrical video signal and outputs the video signal. The video signal is inputted into a first video signal processing section 207. After noise removal and an amplification process are performed on the video signal, the processed video signal is transmitted to a video signal recording section 213. The video signal recording section 213 records the video signal in a storage medium. As the storage medium, a semiconductor memory such as an SD card may be used.

The first video signal processing section 207 cuts out an arbitrary region (referred to as "AF range 303 of the first optical system") within a shooting range 301 (a taken image) of the first optical system 101 and outputs the cut-out image to a first contrast detection section 209. The first contrast detection section 209 calculates a contrast value of the image included in the AF range 303 of the first optical system. The first focus lens 203 of the first optical system 101 is positioned at a position where the result of the contrast value is at its maximum. In other words, a first focus driving section 211 drives the first focus lens 203 on the basis of an instruction of the first contrast detection section 209.

The second optical system 102 has substantially the same configuration as that of the first optical system 101. The second optical system 102 is a zoom optical system. A second zoom lens 202 shifts forward and backward to change the shooting view angle (change the zoom power). In addition, a second focus lens 204 shifts to adjust the focus position.

Similarly, the second imaging element 206 converts an optical image formed by the second optical system 102 into an electrical video signal and outputs the video signal. The video signal is inputted into a second video signal processing section 208, and noise removal and an amplification process are performed on the video signal. Then, the second video signal processing section 208 cuts out an arbitrary region (referred to as "AF range 304 of the second optical system") within a shooting range 302 (a taken image) of the second optical system 102 and outputs the cut-out image to a second contrast detection section 210. The second contrast detection section 210 calculates a contrast value of the AF range 304 of the second optical system and controls a second focus driving section 212 which drives the second focus lens 204.

The second video signal processing section 208 further outputs the taken image to a movement prediction section 214 and a distance detection section 215. The movement prediction section 214 detects a position of an object such as a person (a second object 306) within the taken image. Then, the movement prediction section 214 calculates a velocity vector 307 of the second object 306 from a temporal change of the position of the second object 306 within the taken image. When a result of the calculation meets a predetermined condition, the movement prediction section 214 instructs the first focus driving section 211, which drives the first optical system 101, to shift the first focus lens 203. At the same time, the distance detection section 215 refers to either one or both of the taken image and the output of the second contrast detection section 210, calculates the distance to the second object 306, and outputs the calculated distance to the first focus driving section 211. In addition, the second video signal processing section 208 is also different in configuration from the first video signal processing section 207 in that the second video signal processing section 208 does not output the taken image to the video signal recording section 213.

[1-2. Operation]

An operation of the thus-configured imaging device 100 according to Embodiment 1 when taking a moving image will be described step by step with reference to diagrams of FIGS. 3A and 3B and a flowchart of FIG. 4.

(Start)

When a photographer presses the shutter button 103, a moving image shooting operation is started. Specifically, the first imaging element 205 converts an optical image formed by the first optical system 101 into a video signal. The first video signal processing section 207 performs various processes (noise removal and amplification) on the video signal. The processed video signal is recorded by the video signal recording section 213 in a storage medium such as a semiconductor memory (e.g., an SD card). These operations are repeated at previously-selected frame intervals for a moving image, for example, at intervals of 1/30 sec.

Figure 3A:
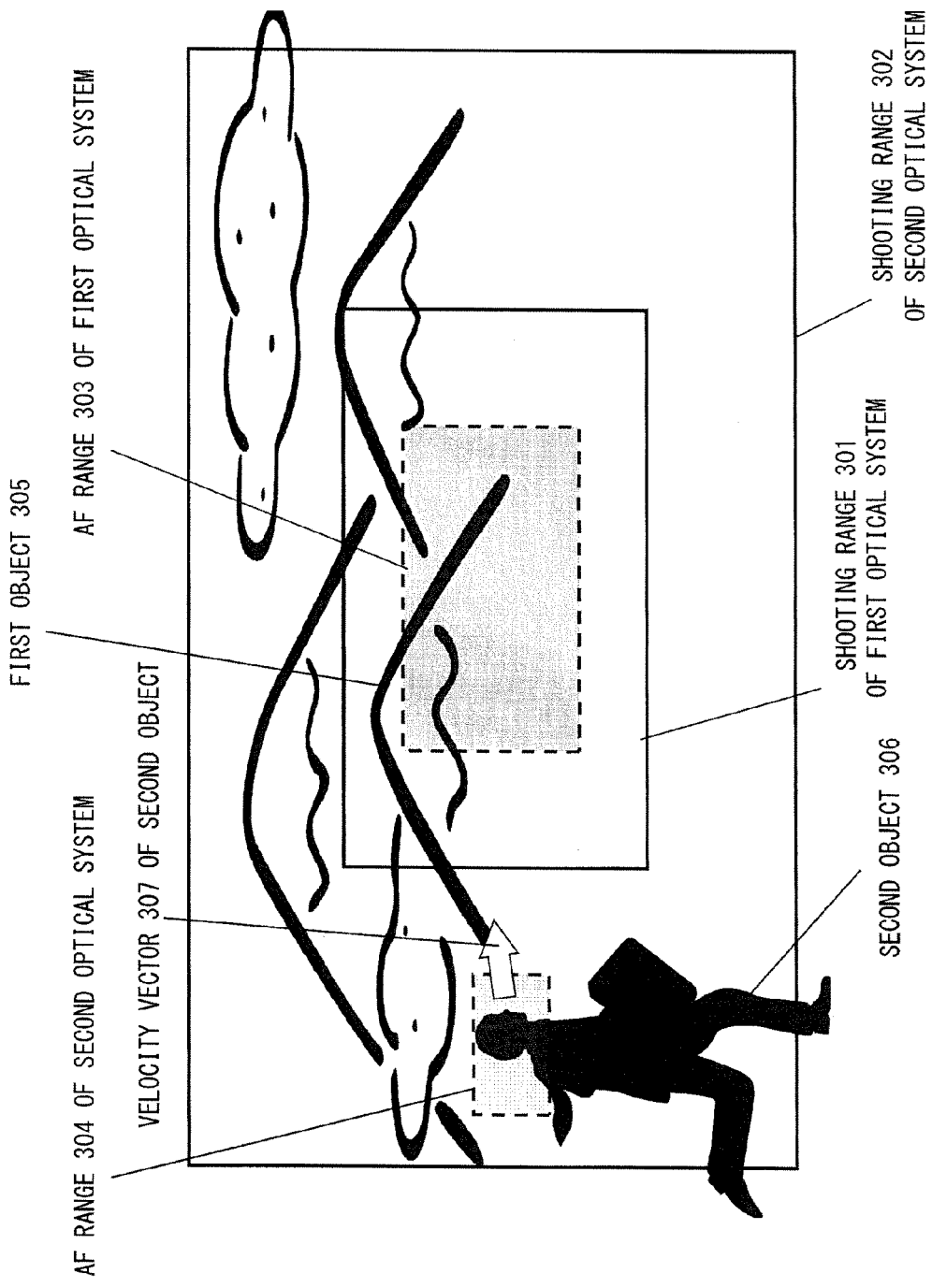
FIG. 3A is a diagram for illustrating an operation of the imaging device according to Embodiment 1.
Figure 4:
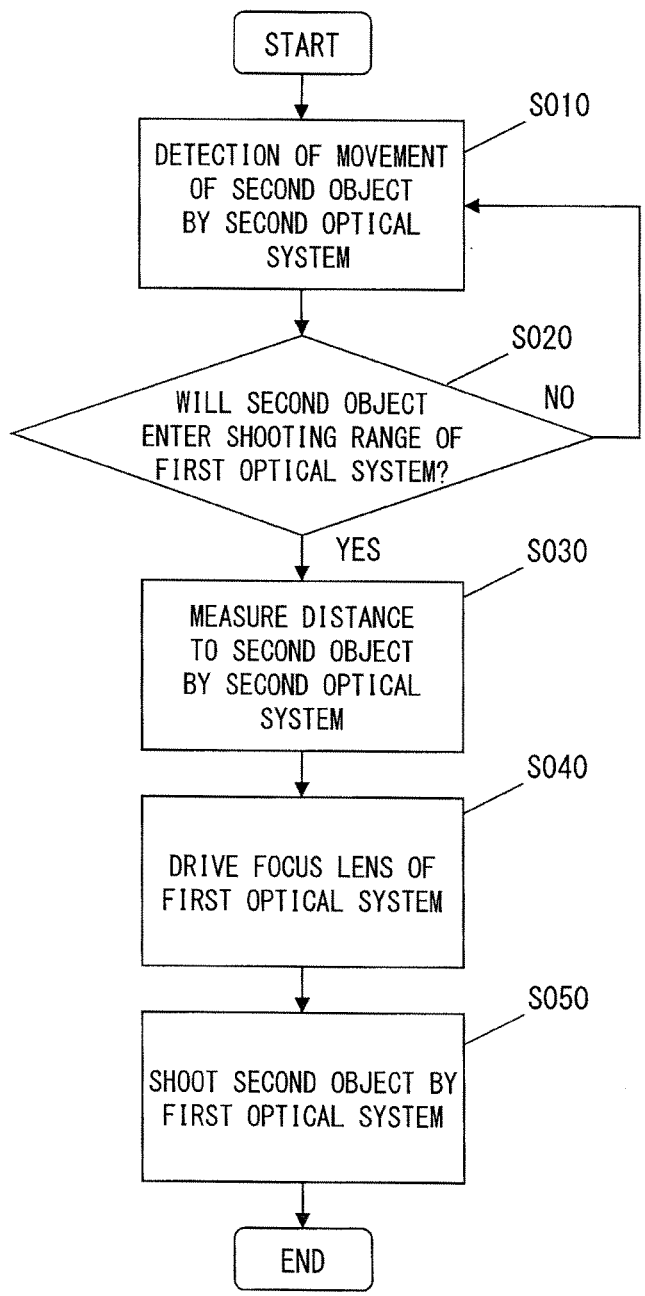
FIG. 4 is a flowchart illustrating the operation of the imaging device according to Embodiment 1.

Here, the first optical system 101 is set to have a telephoto angle, and the shooting range 301 of the first optical system is smaller in size than the shooting range 302 of the second optical system as shown in FIG. 3A. Thus, no object such as a person is found within the shooting range 301 of the first optical system 101. In addition, the AF range 303 of the first optical system is set at the central portion of the image as shown in FIG. 3A. Therefore, in the example of FIG. 3A, the background such as a mountain at a long distance becomes a first object 305. Then, an image of the first object 305, namely, a background image is cut out, and the first contrast detection section 209 calculates a contrast value from the cut-out image. As a result, the first focus lens 203 is positioned such that the first optical system 101 focuses on the background image, namely, such that a position at an infinite distance becomes the focus position. The above-described operation corresponds to an auto-focusing operation in a general imaging device.

(S010: Detection of Movement of Second Object Using Second Optical System)

Meanwhile, the second optical system 102 is set to have a wide angle, and the shooting range 302 of the second optical system is much larger in size than the shooting range 301 of the first optical system as shown in FIG. 3A. An auto-focusing operation of the second optical system 102 is totally different from an auto-focusing operation in another imaging device, and thus will be described in detail below.

When the shooting operation is started, the second imaging element 206 converts an optical image formed by the second optical system 102 into an electrical video signal and outputs the video signal. The video signal is inputted into the second video signal processing section 208. The second video signal processing section 208 performs mask processing on the shooting range 301 of the first optical system within the shooting range 302 of the second optical system (in other words, fills the shooting range 301 with black for excluding the shooting range 301 from the processing target). Then, the taken image of the second optical system 102 after the mask processing is monitored to search for an object such as a person, a pet, a car, or a train (the second object 306). Here, object detection may be performed based on a degree of agreement with a previously-registered shape, color, or pattern. For example, a known method as a face detection technique may be used.

As described above, the second video signal processing section 208 continuously repeats object detection on the taken image resulting from the mask processing on the shooting range 301 of the first optical system. When the second video signal processing section 208 detects the second object 306, the second video signal processing section 208 follows the position of the second object 306, also calculates the position of the second object 306, and outputs the position of the second object 306 calculated at each frame, to the movement prediction section 214. It is noted that as a method for calculating the position of the second object 306, a method may be used in which addition with weighing is performed with respect to pixels whose color or pattern coincide with a previously-registered color or pattern and then the center of gravity of the image is calculated. Alternatively, the eyes of a person or pet may be extracted as a specific image pattern by pattern matching and the midpoint between the positions of both eyes may be outputted as the position of the second object 306.

In addition, for each frame, the second video signal processing section 208 sets the AF range 304 of the second optical system for the second object 306 as shown in FIG. 3A. Then, the second video signal processing section 208 cuts out the AF range 304 of the second optical system and outputs the cut-out image to the second contrast detection section 210. The second contrast detection section 210 calculates a contrast value of the AF range 304 of the second optical system for each frame. Then, the second focus driving section 212 controls driving of the second focus lens 204. As a result, the second optical system 102 can constantly focus on the second object 306, and thus an advantage is provided that the object detection and the following operation can be performed with high accuracy.

(S020: Will Second Object Enter Shooting Range of First Optical System?)

The movement prediction section 214 receives the position of the second object 306 of each frame. The movement prediction section 214 calculates the velocity vector 307 of the second object 306 from a change of the position of the second object 306 between frames and predicts movement of the second object 306. For example, the movement prediction section 214 calculates the velocity vector 307 of the second object 306 from the difference in position of the second object between an immediately previous frame and the current frame. Then, the movement prediction section 214 adds K velocity vectors 307 of the second object 306 to the position of the second object 306 at the current frame. By so doing, the position of the second object 306 at K frames ahead can be predicted. It is noted that all positions of the second object 306 at frames that are prior to the current frame by two or more frames may be referred to. For example, the velocity vector 307 of the second object 306 is calculated at each time point and stored. All of them are referred to, and a change of the velocity vector 307 relative to a time axis is plotted. A quadratic function is fitted to the result of the plotting by the least-square method. The quadratic function may be used to predict the position of the second object 306 at the K frames ahead. Alternatively, a quadratic function or the like may be similarly fitted to the position of the second object 306.

The thus-predicted position of the second object 306 at the K frames ahead and the masked region, namely, the shooting range 301 of the first optical system, are compared to each other. When a result of the comparison is No, namely, the position of the second object 306 at the K frames ahead is not included in the shooting range 301 of the first optical system, the processing returns to the previous step (S010) to continue detection of the second object 306. When the result of the comparison is Yes, namely, the position of the second object 306 at the K frames ahead is included in the shooting range 301 of the first optical system, the processing proceeds to the next step (S030).

(S030: Measure Distance to Second Object by Second Optical System)

When it is determined as Yes at step (S020), the distance detection section 215 receives various information on the second object 306 from the second video signal processing section 208 and determines the size of the second object 306. For example, the distance detection section 215 may receive an image obtained by cutting out the AF range 304 of the second optical system and may determine the size of the second object 306 from the cut-out size. Alternatively, the distance detection section 215 may estimate the size of the second object 306 from the size of a specific image pattern such as the eyes of a person or pet. For example, the interval between the eyes of a person is an index suitable for identifying the size of the object. The size of the object can be determined also from the size of a window of a train or car. Still alternatively, in the process of calculating the center of gravity of the image, the size of the object may be determined from the number of pixels that are identified as the second object 306. If segmentation technology in which the color or brightness change of the taken image, edge detection, and the like are combined to perform region segmentation is employed, the size of the object can be determined further accurately. The distance to the second object 306 is measured from a result of the determination of the size of the second object 306 and types of registered objects (person, pet, car, train) as described above.

In this case, the distance detection section 215 may refer to information on the position of the second focus lens 204 of the second optical system 102. Specifically, since the second focus lens 204 is positioned so as to focus on the second object 306, the distance to the second object 306 can be calculated by back calculation from the position of the second focus lens 204. The information on the position of the second focus lens 204 can be obtained from the second focus driving section 212 which positions the second focus lens 204, further from the second contrast detection section 210 which controls the second focus driving section 212.

(S040: Drive Focus Lens of First Optical System)

The movement prediction section 214 instructs the first focus driving section 211 of the first optical system 101 to shift the first focus lens 203. The first focus driving section 211 reads out a result of the distance measurement of the distance detection section 215, compares the result to the current position of the first focus lens 203, and drives the first focus lens 203 so as to eliminate the difference therebetween. In other words, the first focus driving section 211 temporarily neglects a result of the contrast detection of the first contrast detection section 209. Then, the first focus driving section 211 refers to the distance to the second object 306 which is detected by the distance detection section 215, and shifts the first focus lens 203. In other words, the first focus driving section 211 drives the first focus lens 203 to such a position that the first optical system 101 will focus on the second object 306.

(S050: Shoot Second Object by First Optical System)

Figure 3B:
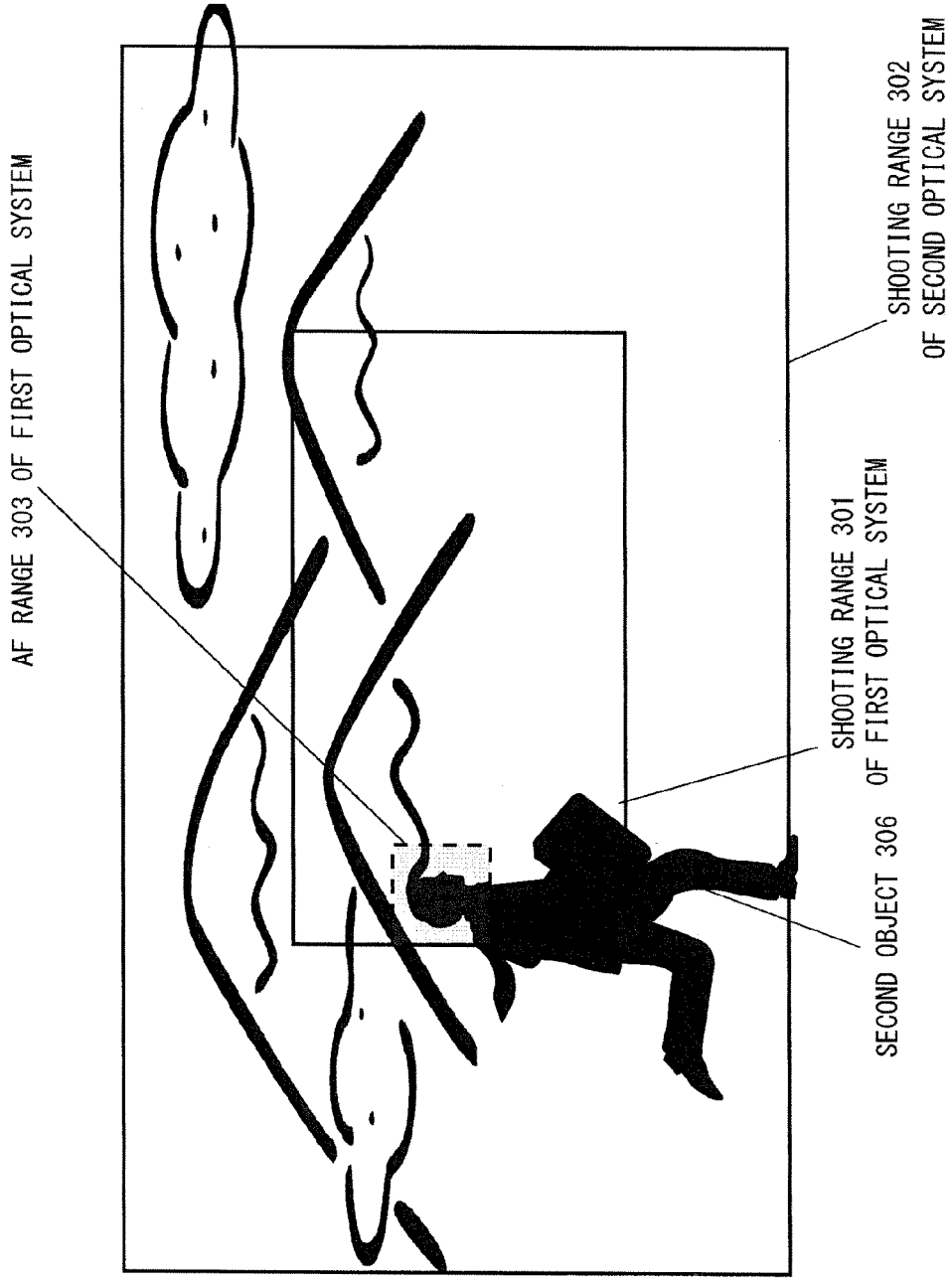
FIG. 3B is a diagram for illustrating the operation of the imaging device according to Embodiment 1.

According to the position of the second object 306 which is predicted by the movement prediction section 214, the first video signal processing section 207 changes the AF range 303 of the first optical system as shown in FIG. 3B. Specifically, the first video signal processing section 207 sets the AF range 303 of the first optical system at a position where the second object will enter within the shooting range 301 of the first optical system to which position the second object 306 will go in. Then, the first video signal processing section 207 cuts out an image of the newly set AF range 303 of the first optical system and outputs the image to the first contrast detection section 209. The first contrast detection section 209 calculates a contrast value of the AF range 303 of the first optical system at each frame. Then, the first contrast detection section 209 controls the first focus driving section 211 to drive the first focus lens 203. As a result, the first optical system 101 can be made to constantly focus on the second object 306, and an advantage is obtained that a clear image of the second object 306 can be constantly recorded.

At the same time, also in the first optical system 101, detection of the second object 306 is performed mainly in the AF range 303 of the first optical system. In other words, the first video signal processing section 207 performs a known following operation on the second object 306. Thus, even when the second object 306 moves within the shooting range 301 of the first optical system, a clear image of the second object 306 can be continuously recorded.

[1-3. Advantageous Effects Etc.]

In the conventional art, when an object such as a person runs into a shooting range during shooting, it is difficult to instantly change the focus position to the running-in object. Thus, an unclear (blurred) image of the object is continuously taken and recorded.

In contrast, in the imaging device 100 according to Embodiment 1, the second video signal processing section 208 detects the position of the second object 306 within the shooting range 302 of the second optical system. Then, the movement prediction section 214 predicts the moment at which the second object 306 will enter the shooting range 301 of the first optical system. In addition, the distance detection section 215 measures the distance to the second object 306. Then, the first focus driving section 211 shifts the first focus lens 203 according to the distance to the second object 306. Thus, even when the second object 306 suddenly enters the shooting range 301 of the first optical system, the first optical system 101 can be made to instantly focus on the second object 306. Therefore, a clear image of the entering second object 306 can be taken and recorded.

Embodiment 2

Hereinafter, Embodiment 2 will be described with reference to FIGS. 5A to 6.

[2-1. Configuration and Operation]

The configuration of an imaging device 100 according to Embodiment 2 is the same as that in Embodiment 1 shown in FIGS. 1 and 2, and thus the description thereof is omitted. With regard to an operation of the imaging device 100 according to Embodiment 2, an operation when taking a moving image will be described step by step with reference to diagrams of FIGS. 5A and 5B and a flowchart of FIG. 6. In Embodiment 1, the case where the second object 306 moves is assumed on the premise that the imaging device 100 is generally fixed. In Embodiment 2, the case is assumed where the second object 306 generally remains still and the imaging device 100 moves by a shooting method such as pan.

(Start)

When a photographer presses the shutter button 103, a moving image taking shooting is started.

(S110: Detection of Movement of Imaging Device)

When the shooting operation is started, the second imaging element 206 converts an optical image formed by the second optical system 102 into an electrical video signal and outputs the video signal. The video signal is inputted into the second video signal processing section 208. The operation of the second video signal processing section 208 is the same as that in Embodiment 1. It is noted that a description will be given on the assumption that the second object 306 remains still and the imaging device 100 moves as described above.

The second video signal processing section 208 performs mask processing on the shooting range 301 of the first optical system within the shooting range 302 of the second optical system. Then, the second video signal processing section 208 monitors the taken image of the second optical system 102 after the mask processing, to search for the second object 306. The second video signal processing section 208 continuously repeats object detection as described above. Then, when the second video signal processing section 208 detects the second object 306, the second video signal processing section 208 follows the position of the second object 306. Furthermore, the second video signal processing section 208 calculates the position of the second object 306 and outputs the position of the second object 306 calculated at each frame, to the movement prediction section 214. Here, what is outputted to the movement prediction section 214 is the position of an image of the second object 306 on the imaging surface of the second imaging element 206. The position of the image is determined from the relative position relationship between the imaging device 100 and the second object 306. In the case where the imaging device 100 remains still and the second object 306 moves as shown in FIG. 3A, the position of the image of the second object 306 moves. Similarly, even when the second object 306 remains still as shown in FIG. 5A, if the imaging device 100 moves by a shooting operation such as pan, the position of the image of the second object 306 moves. Thus, the second video signal processing section 208 can detect movement of the imaging device 100 from movement of the second object 306.

(S120: Will Second Object Enter Shooting Range of First Optical System?)

The movement prediction section 214 receives the position of the image of the second object 306 at each frame. The movement prediction section 214 calculates the velocity vector 307 of the second object 306 from a change of the position of the image between frames and predicts movement of the second object 306. As described above, the second object 306 remains still. Since the imaging device 100 moves by a shooting operation such as pan, the position of the image second object 306 looks as if moving. However, processing is not different from that in Embodiment 1 and may be performed in the same manner as in Embodiment 1. Specifically, a position of the image of the second object 306 at K frames ahead is predicted and compared to the masked region, namely, the shooting range 301 of the first optical system. When a result of the comparison is No, namely, the position of the image of the second object 306 at the K frames ahead is not included in the shooting range 301 of the first optical system, the processing returns to the previous step (S110) to continue detection of the second object 306. When the result of the comparison is Yes, namely, the position of the image of the second object 306 at the K frames ahead is included in the shooting range 301 of the first optical system, the processing proceeds to the next step (S130). For example, even when the second object 306 itself remains still as shown in FIG. 5B, the second object 306 enters the shooting range 301 of the first optical system.

With regard to the subsequent processes as well, it suffices to perform the same processes as those in Embodiment 1. In other words, at step (130), the same process as that at step (S030) in FIG. 4 is performed; at step (S140), the same process as that at step (S040) in FIG. 4 is performed; and at step (S150), the same process as that at step (S050) in FIG. 4 is performed.

[2-3. Advantageous Effects Etc.]

In the conventional art, also when a photographer performs shooting (e.g., panning shooting) while changing the direction of an imaging device, it is difficult to instantly focus on an object that newly enters a shooting range. Thus, an unclear (blurred) image of the object is continuously taken and recorded.

In contrast, in the imaging device 100 according to Embodiment 2, the second video signal processing section 208 detects the position of the second object 306 within the shooting range 302 of the second optical system. Then, the movement prediction section 214 predicts the moment at which the second object 306 will enter the shooting range 301 of the first optical system. In addition, the distance detection section 215 measures the distance to the second object 306. Then, the first focus driving section 211 shifts the first focus lens 203 according to the distance to the second object 306. Thus, even when the imaging device 100 moves by a shooting operation such as pan, the first optical system 101 can be made to instantly focus on the second object 306. Then, a clear image of the second object 306 can be taken and recorded.

Eventually, the position of the image of the second object 306 becomes a processing target. Embodiment 1 assumes the case where the second object 306 moves. Embodiment 2 assumes the case where the second object 306 remains still and the imaging device 100 rotates (is panned). In either case, the relative position relationship between the second object 306 and the imaging device 100 changes. If so, the position of the image of the second object 306 within the shooting range 302 of the second optical system changes. This change is calculated as the velocity vector 307 of the second object 306. Then, the moment at which the image of the second object 306 will enter the shooting range 301 of the first optical system is predicted by using the calculated velocity vector 307. In addition, the distance to the second object 306 is measured from the image taken with the second optical system 102. Thus, the focus position of the first optical system 101 can be changed at the moment at which the second object 306 will enter the shooting range 301 of the first optical system, and a clear image of the second object 306 can be taken and recorded. It is understood that even in the case where the second object 306 moves and the imaging device 100 moves, it suffices to perform the same operation as those in Embodiment 1 and Embodiment 2.

As described above, according to the present disclosure, the position of the image of the second object within the second shooting range of the second optical system is detected, and the moment at which the second object will enter the first shooting range of the movement prediction section is predicted. Then, the first focus driving section shifts the focus lens of the first optical system to another position. Thus, even when the second object suddenly enters the first shooting region of the first optical system, the first optical system can be made to instantly focus on the second object.

Furthermore, the first shooting range of the first optical system which performs telephoto shooting is small in size. Thus, an object is sometimes out of the first shooting range. In such a case, the first optical system focuses on the background (first object) such as a mountain or a grove at an infinite distance. Meanwhile, the second shooting range of the second optical system which performs wide-angle shooting is large in size. Thus, the position of a second object such as a running person can be detected, and the velocity vector (direction and magnitude) of the second object can be calculated. Thus, the moment at which the second object will enter the first shooting range can be predicted. Then, the focus lens can be shifted, for example, toward the close-range side at the moment at which the second object such as a person will enter the first shooting range. Therefore, it is possible to instantly focus on the running-in person, and a clear image of the object (the face of a person or the like) can be taken and recorded.

Other Embodiments

Embodiments 1 and 2 have been described above as illustrative examples of the technology disclosed in the present application. However, the technology in the present disclosure is not limited thereto and is also applicable to embodiments in which changes, substitutions, additions, omissions, and the like are made as appropriate. In addition, each constituent element described in Embodiments 1 and 2 described above can be combined to provide a new embodiment. Other embodiments will be described below.

Figure 5A:
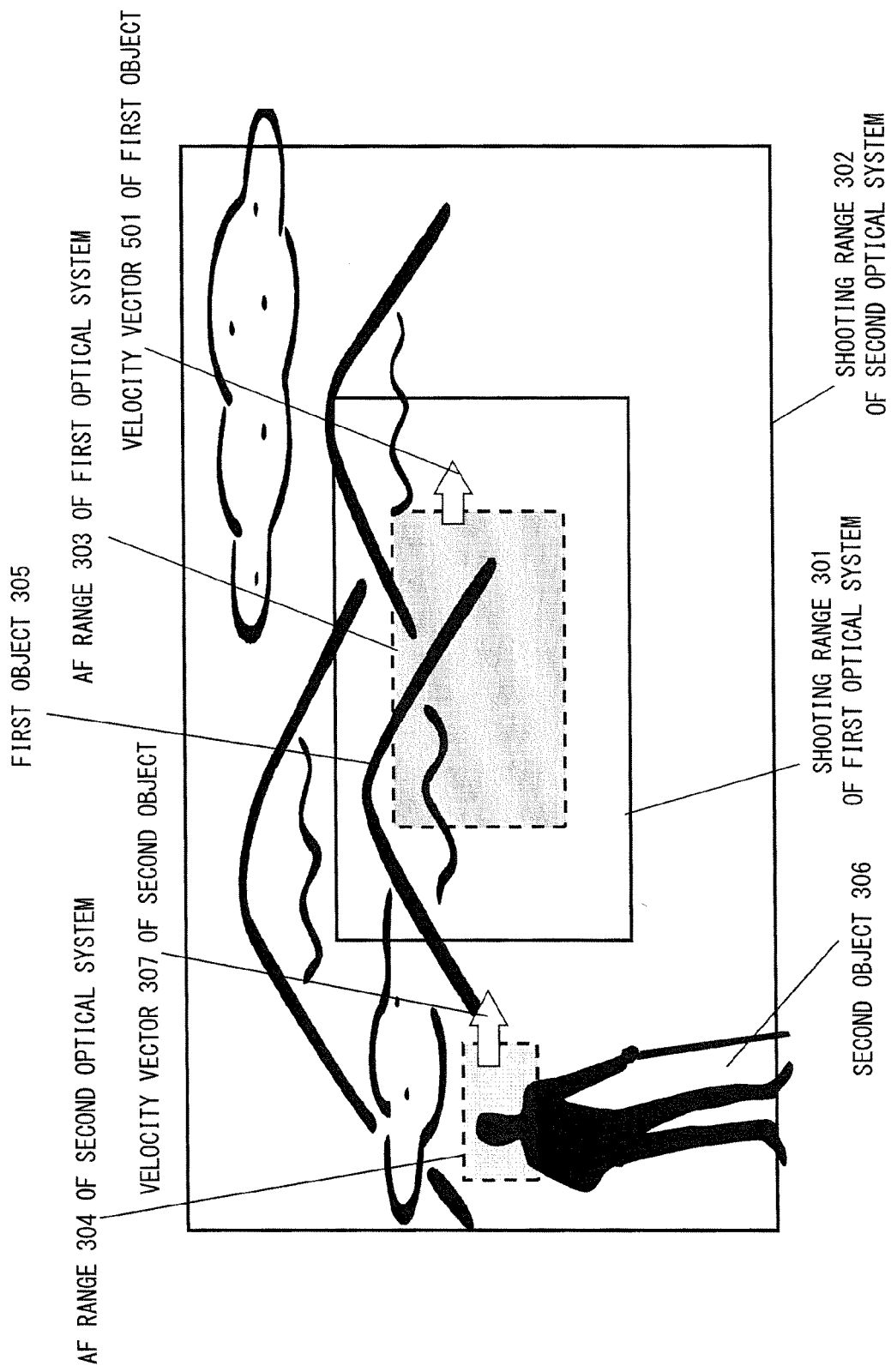
FIG. 5A is a diagram for illustrating an operation of an imaging device according to Embodiment 2.
Figure 5B:
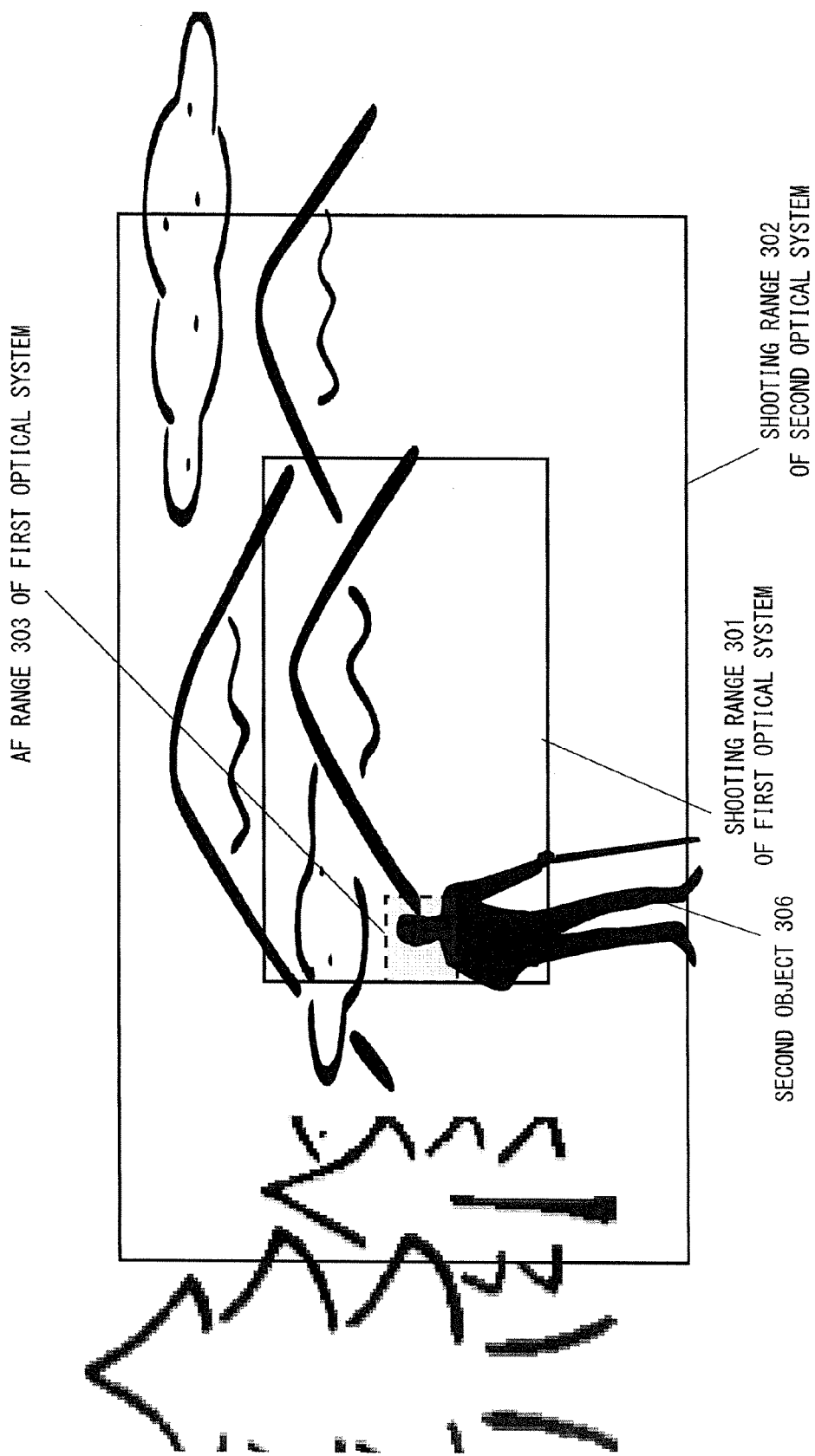
FIG. 5B is a diagram for illustrating the operation of the imaging device according to Embodiment 2.
Figure 6:
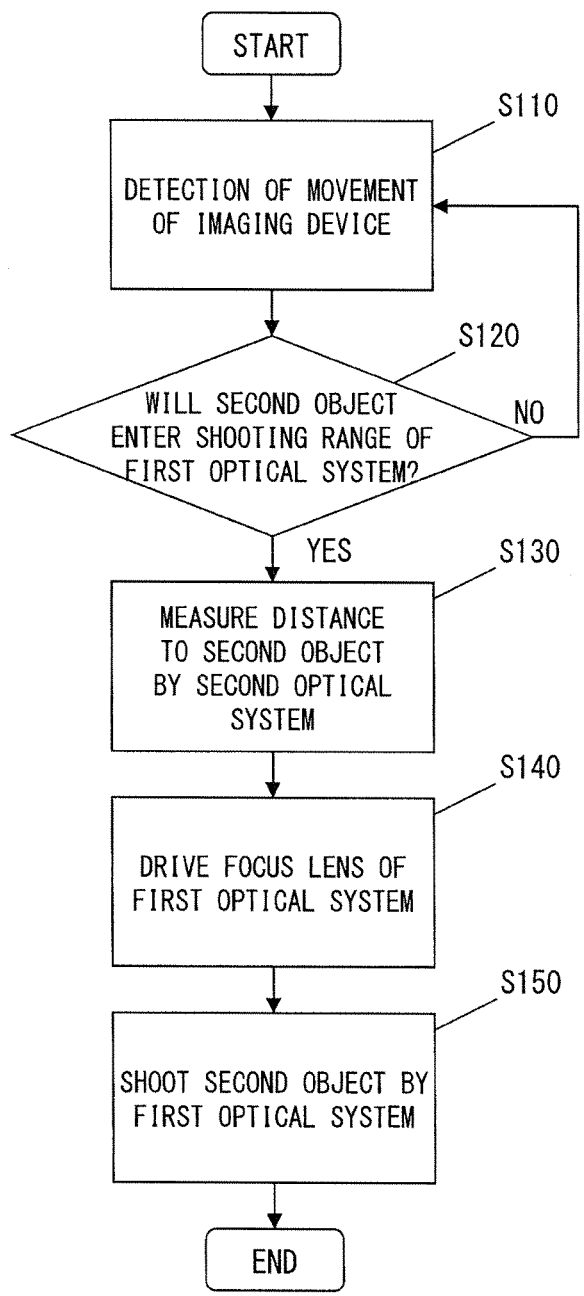
FIG. 6 is a flowchart illustrating the operation of the imaging device according to Embodiment 2.

In addition to the position of the second object 306, the position of the first object 305 may also be detected and a velocity vector 501 of the first object 305 may be calculated as shown in FIG. 5A. Specifically, the position of the first object 305 included in the AF range 303 of the first optical system is calculated. Then, the velocity vector 501 of the first object 305 is calculated from a change of the position between frames. The velocity vector 501 is compared to the velocity vector 307 of the second object 306. When both substantially coincide with each other, it can be determined that the second object 306 remains still and only the imaging device 100 is moving. In other words, an effect is provided that the movement of the imaging device 100 can be further accurately determined.

It is noted that when the movement of the imaging device 100 is translational movement, the longer the distance to an object is, the lower the velocity of the object is. Meanwhile, when the movement of the imaging device 100 is rotational movement, the velocity is constant regardless of the distance. When these features are utilized, an effect is provided that the movement of the imaging device 100 can be determined in more detail.

Moreover, the imaging device 100 may be equipped with a gyro sensor, an electromagnetic compass, or an acceleration sensor. By referring to their outputs, the movement of the imaging device 100 can be detected with further high accuracy.

Furthermore, in Embodiment 1 described above, the example has been described where the position of the second object 306 after K frames from a certain frame is predicted. A frame number may be converted into a time by using the value of the frame rate, and a predicted position of the second object 306 after elapse of a predetermined time period (e.g., after S seconds) from a certain time point may be calculated.

Furthermore, driving of the first focus lens 203 at steps (S040) and (S140) in Embodiment 1 and Embodiment 2 may be performed at the moment at which the second object 306 will enter the shooting range 301 of the first optical system. In addition, it is also possible to shift the first focus lens 203 in several seconds. For example, it is assumed that at step (S020) or (S120), the movement prediction section 214 predicts that the second object 306 will enter the shooting range 301 of the first optical system after K seconds. At step (S040) or (S140), the first focus driving section 211 shifts the first focus lens 203 in 2 seconds after (K−2) seconds. When the first optical system 101 performs a smooth focusing operation as described above, an advantage is provided that an easily viewable image (moving image) that provides less uncomfortable feeling can be taken and recorded.

Furthermore, at steps (S020) and (S120) in Embodiment 1 and Embodiment 2, the movement prediction section 214 calculates the velocity vector 307 of the second object as a two-dimensional vector. The movement prediction section 214 may calculate a three-dimensional vector. Specifically, the movement prediction section 214 receives, from the distance detection section 215, the result of the measurement of the distance to the second object 306. From this, the movement prediction section 214 calculates a three-dimensional velocity vector which takes into account a distance Z in addition to a two-dimensional position, X and Y, in the shooting range 302 of the second optical system. By so doing, a temporal change of the distance Z can also be predicted. For example, a marked effect is provided that the distance to the second object 306 after K seconds can be predicted. Needless to say, driving of the first focus lens 203 at steps (S040) and (S140) is also performed on the basis of the predicted distance. Thus, performance of focusing on the second object 306 can be further enhanced.

Furthermore, at steps (S010) and (S110) in Embodiment 1 and Embodiment 2, the second video signal processing section 208 outputs the position of the image of the second object 306. This position may be outputted as a relative position to the shooting range 301 of the first optical system. When configured thus, a case where the photographer changes the shooting view angle of the first optical system 101 can also be handled. Specifically, the first zoom lens 201 of the first optical system 101 is shifted to change the shooting view angle of the first optical system 101. By so doing, the ratio of the shooting range 301 of the first optical system to the shooting range 302 of the second optical system is increased or decreased. In other words, the size of the masked region at step (S010) or (S110) changes every frame. Taking into account this change, the position of the second object 306 may be outputted. For example, a state where both the second object 306 and the imaging device 100 remain still is considered. In this state, the position of the image of the second object 306 within the shooting range 302 of the second optical system is fixed. Thus, for example, in FIG. 4, the result of the determination at step (S020) is constantly No, and the processing returns to the previous step (S010). Here, it is assumed that the photographer instructs the first optical system 101 to perform a variable-power operation to change the first optical system 101 to the wide-angle side. Then, the shooting range 301 of the first optical system is enlarged. Thus, after K seconds, the second object 306 which remains still enters the shooting range 301 of the first optical system. In such a case as well, the second video signal processing section 208 suffices to output the position of the second object 306 as a relative position to the shooting range 301 of the first optical system.

Furthermore, the second optical system 102 may not be a zoom optical system. The second optical system 102 may be an optical system having a fixed view angle. In this case, the second optical system 102 may be an optical system having a view angle wider than that of the first optical system 101. In addition, the second focus lens 204 is also not essential. In other words, as the second optical system 102, a pan-focus optical system may be used. In this case, the second focus driving section 212 and the second contrast detection section 210 are not needed.

In recent years, an imaging device that includes a plurality of sets (e.g., two sets) of an imaging optical system and an imaging element for the purpose of taking a stereoscopic image has been commercially available. When the technology in the present disclosure is utilized, a function for improving photographer's convenience other than taking a stereoscopic image can be provided to such a type of imaging device.

The present disclosure is suitable for imaging devices such as a digital still camera and a digital video camera.

The embodiments have been described above as illustrative examples of the technology in the present disclosure. For that, the accompanying drawings and the detailed description have been provided.

Therefore, the constituent elements described in the accompanying drawings and the detailed description may include not only constituent elements essential for solving the problems but also constituent elements non-essential for solving the problems, in order to illustrate the technology described above. Thus, these non-essential constituent elements should not be readily recognized as being essential, due to these non-essential constituent elements being described in the accompanying drawings and the detailed description.

Furthermore, since the embodiments described above are intended to illustrate the technology in the present disclosure, various changes, substitutions, additions, omissions, and the like can be made within the scope of the claims and the scope of equivalents thereof.

What is claimed is:

1. An imaging device for taking an image of an object, the imaging device comprising:
    a first optical system;
    a second optical system;
    a first imaging element configured to convert an optical image of a first shooting range formed by the first optical system into an electrical signal;
    a second imaging element configured to convert an optical image of a second shooting range formed by the second optical system into an electrical signal;
    a video signal processing section configured to select an arbitrary portion within the first shooting range as an first AF range and output an electrical signal of the first AF range;
    a focus driving section configured to shift a focus lens of the first optical system; and
    a movement prediction section configured to predict movement of an image of an object which is included in the second shooting range and present outside the first shooting range,
    wherein, if the movement prediction section predicts that the object will enter the first shooting range, the video signal processing section sets the first AF range in accordance with a predicted path of the object.

2. The imaging device according to claim 1, further comprising a contrast detection section configured to process the electrical signal of the first AF range which is an output of the video signal processing section, and output a degree of focusing within the first AF range,
    wherein the focus driving section is driven in accordance with an output of the contrast detection section.

3. The imaging device according to claim 2, wherein, if the movement prediction section predicts that the object will enter the first shooting range, the video signal processing section shifts the first AF range to a position where the object will enter the first shooting range.

4. The imaging device according to claim 1, further comprising:
    a second video signal processing section configured to select a position of the object within the second shooting range as a second AF range and output an electrical signal of the second AF range; and
    a distance detection section configured to detect a size of the object on the basis of the electrical signal of the second AF range,
    wherein the video signal processing section changes a size of the first AF range in accordance with the size of the object.

5. The imaging device according to claim 4, further comprising a second contrast detection section configured to output a degree of focusing within the second AF range on the basis of the electrical signal of the second AF range, wherein:
    the distance detection section calculates a distance to the object on the basis of the size of the object and an output of the second contrast detection section, and
    the second video signal processing section shifts the focus lens of the first optical system in accordance with the distance to the object.

* * * * *